United States Patent
Seo et al.

(10) Patent No.: US 8,318,360 B2
(45) Date of Patent: Nov. 27, 2012

(54) ORGANIC/INORGANIC COMPOSITE POROUS MEMBRANE AND ELECTROCHEMICAL DEVICE USING THE SAME

(75) Inventors: Dae Jong Seo, Daejeon (KR); Seok Koo Kim, Daejeon (KR); Jang Hyuk Hong, Daejeon (KR); Joon Yong Sohn, Busan (KR); Sang Young Lee, Daejeon (KR); Soon Ho Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 63 days.

(21) Appl. No.: 12/916,941

(22) Filed: Nov. 1, 2010

(65) Prior Publication Data

US 2011/0045168 A1   Feb. 24, 2011

Related U.S. Application Data

(62) Division of application No. 11/563,977, filed on Nov. 28, 2006, now Pat. No. 7,883,799.

(30) Foreign Application Priority Data

Nov. 28, 2005 (KR) .................. 10-2005-0114106
Feb. 16, 2006 (KR) .................. 10-2006-0015205

(51) Int. Cl.
   *H01M 2/16* (2006.01)
(52) U.S. Cl. .................. 429/251; 429/247
(58) Field of Classification Search .................. None
   See application file for complete search history.

(56) References Cited

U.S. PATENT DOCUMENTS

| | | | |
|---|---|---|---|
| 3,861,963 A | | 1/1975 | Afrance et al. |
| 4,980,062 A | * | 12/1990 | Block .................. 210/490 |
| 6,143,063 A | * | 11/2000 | Hayashi et al. .......... 106/287.18 |
| 6,432,586 B1 | | 8/2002 | Zhang |
| 2002/0102455 A1 | | 8/2002 | Daroux et al. |
| 2002/0187401 A1 | * | 12/2002 | Lee et al. .................. 429/303 |
| 2005/0255769 A1 | | 11/2005 | Henninge et al. |

(Continued)

FOREIGN PATENT DOCUMENTS

JP       2001319634       11/2001

(Continued)

OTHER PUBLICATIONS

Extended European search report for application No. 06823743.7-1227/1955390 dated Jun. 9, 2010.

(Continued)

*Primary Examiner* — Barbara Gilliam
*Assistant Examiner* — Kwang Han
(74) *Attorney, Agent, or Firm* — Birch, Stewart, Kolasch & Birch, LLP

(57) ABSTRACT

The present invention provides an organic/inorganic composite porous separator, which comprises: (a) a porous substrate having pores; and (b) an organic/inorganic composite layer formed by coating at least one region selected from the group consisting of a surface of the substrate and a part of pores present in the substrate with a mixture of inorganic porous particles and a binder polymer, wherein the inorganic porous particles have a plurality of macropores with a diameter of 50 nm or greater in the particle itself thereby form a pore structure, a manufacturing method thereof, and an electrochemical device using the same. As an additional pathway for lithium ions is created due to a number of pores existing in the inorganic porous particle itself, degradation in the battery performance can be minimized, and energy density per unit weight can be increased by the weight loss effect.

3 Claims, 6 Drawing Sheets

U.S. PATENT DOCUMENTS

2006/0286446 A1    12/2006    Chun et al.

FOREIGN PATENT DOCUMENTS

| | | |
|---|---|---|
| JP | 2003-007279 A | 1/2003 |
| JP | 2003-157823 A | 5/2003 |
| KR | 1020010095623 | 11/2001 |
| WO | 2004067453 | 8/2004 |

OTHER PUBLICATIONS

Korean Office Action dated Apr. 24, 2007 for Application No. 10-2006-0118173.
International Search Report dated Feb. 26, 2007 for Application No. PCT/KR2006/005035.
Non-patent literature document dated 1987.

* cited by examiner

US 8,318,360 B2

ORGANIC/INORGANIC COMPOSITE POROUS MEMBRANE AND ELECTROCHEMICAL DEVICE USING THE SAME

This application is a divisional of U.S. application Ser. No. 11/563,977, filed on Nov. 28, 2006, which claims the benefit of Korean Patent Application Nos. 10-2005-0114106 and 10-2006-0015205, filed Nov. 28, 2005 and Feb. 16, 2006, respectively in Korea, which are hereby incorporated by reference in their entirety for all purposes as if fully set forth herein.

TECHNICAL FIELD

The present invention relates to a novel organic/inorganic composite porous separator that can ensure electrochemical safety and improve quality at the same time, and an electrochemical device using the same. More specifically, the present invention relates to a novel organic/inorganic composite porous separator which contains inorganic porous particles, each having a plurality of pores therein, as a coating material to form an organic/inorganic composite porous layer of a uniform pore size and porosity, and an electrochemical device comprising the same.

BACKGROUND ART

Recently, there is increasing interest in energy storage technology. Batteries have been widely used as energy sources in portable phones, camcorders, notebook computers, PCs and electric cars, resulting in intensive research and development for them. In this regard, electrochemical devices are the subject of great interest. Particularly, development of rechargeable secondary batteries is the focus of attention.

Among the currently used secondary batteries, lithium secondary batteries, developed in early 1990's, have a drive voltage and an energy density higher than those of conventional batteries using aqueous electrolytes (such as Ni-MH batteries, Ni—Cd batteries and $H_2SO_4$—Pb batteries), and thus are spotlighted in the field of secondary batteries. However, lithium secondary batteries have problems related to their safety, due to ignition and explosion caused by the use of organic electrolytes, and are manufactured by a complicated process. Lithium ion polymer batteries, appearing more recently, solve the above-mentioned disadvantages of secondary lithium ion batteries, and thus become one of the most potent candidates of next generation batteries. However, such secondary lithium ion polymer batteries still have low capacity compared to secondary lithium ion batteries. Particularly, they show insufficient discharge capacity at low temperature. Hence, there is an imminent need for the improvement of secondary lithium ion batteries.

A lithium ion battery is manufactured by coating a cathode active material (e.g. $LiCoO_2$) and an anode active material (e.g. graphite), which have crystal structures including interstitial volumes, onto the corresponding current collector (i.e. aluminum foil and copper foil, respectively) to provide a cathode and an anode. Then, a separator is interposed between both electrodes to form an electrode assembly, and an electrolyte is injected into the electrode assembly. During a charge cycle of the battery, lithium intercalated into the crystal structure of the cathode active material is deintercalated, and then intercalated into the crystal structure of the anode active material. On the other hand, during a discharge cycle, lithium intercalated into the anode active material is deintercalated again, and then intercalated back into the crystal structure of the cathode. As charge/discharge cycles are repeated, lithium ions reciprocate between the cathode and the anode. In this regard, a lithium ion battery is also referred to as a rocking chair battery.

Such batteries have been produced by many battery producers. However, most lithium secondary batteries have different safety characteristics depending on several factors. Evaluation of and security in safety of batteries are very important matters to be considered. Particularly, users should be protected from being damaged by malfunctioning batteries. Therefore, safety of batteries is strictly restricted in terms of ignition and combustion of batteries by safety standards.

Many attempts have been made to solve the problem related to the safety of a battery. However, ignition of a battery, caused by a forced internal short circuit due to external impacts (particularly, in the case of a customer-abused battery) cannot be solved yet.

Recently, U.S. Pat. No. 6,432,586 discloses a polyolefin-based separator coated with an inorganic layer such as calcium carbonate, silica, etc., so as to prevent an internal short circuit, caused by dendrite growth inside of a battery. However, in case of adopting such an inorganic composite layer, the battery, compared with the conventional battery using a polymer separator, gets heavier and its quality is deteriorated. In particular, since a part of non-porous inorganic particles in the inorganic material layer influences as resistance to the movement of lithium ions that determines quality of a battery, it is fundamentally not possible to avoid the quality deterioration of the battery. Moreover, an increase in weight by the inorganic material layer causes a decrease in energy density of the battery per unit weight. If the inorganic substance content in the coating layer is reduced to solve this, however, it poses another problem that a satisfactory level of an internal short circuit prevention function is not obtained.

Meanwhile, the international union of pure and applied chemistry (IUPAC) defines a pore of 2 nm or shorter in diameter as a micropore, a pore of 2 to 50 nm in diameter as a mesopore, and a pore of 50 nm or greater in diameter as a macropore. Porous materials are expected to hold interest continuously not only for industrial applications but also for academic aspects. Pores are something to be removed in the field of powder metallurgy to obtain a sintered compact, and regarded as defects to be controlled in a casting process to manufacture a sound casting. Nevertheless, a porous material having pores of uniform size and regular arrangement is continuously utilized in various industries that appreciate adsorption and separation efficiency of the porous material. Manufacturing methods of such porous materials include a self-assembly technique, an aerogel manufacturing technique through a sol-gel process, an anodic oxidation technique of aluminum, a condensation drying technique and the like. However, these techniques are mainly used for manufacturing films or monolith porous materials, not for particles.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

In view of the foregoing problems, it is an object of the present invention to provide an organic/inorganic composite porous separator formed of (a) a porous substrate, (b) an organic/inorganic composite layer, and (c) inorganic particles with pore structures of uniform size, in which the organic/inorganic composite coating layer formed on the porous substrate contains inorganic porous particles having a number of macropores, so that the flow of lithium ions may progress smoothly, degree of swelling with electrolyte may be improved, and energy density per unit weight of a device may be significantly increased due to a substantial decrease in the weight of the organic/inorganic composite porous separator.

An aspect of the present invention provides an organic/inorganic composite porous separator, which comprises: (a) a porous substrate having pores; and (b) an organic/inorganic composite layer formed by coating at least one region selected from the group consisting of a surface of the substrate and a part of pores present in the substrate with a mixture of inorganic porous particles and a binder polymer, wherein the inorganic porous particles have a plurality of macropores with a diameter of 50 nm or greater in the particle itself thereby form a pore structure; and an electrochemical device (preferably, a lithium secondary battery) comprising the same.

Another aspect of the present invention provides a manufacturing method of the organic/inorganic composite porous separator, which includes the steps of: (a) dispersing inorganic precursors and heat-decomposable compounds in a dispersion medium, misting the inorganic precursor solution, and performing a thermal decomposition and a crystallization processes, to thereby prepare inorganic porous particles; (b) adding and mixing the inorganic porous particles obtained from step (a) with a polymer solution containing a binder polymer; and (c) coating the mixture obtained from step (b) on at least one region selected from the group consisting of a surface of the substrate having pores and a part of the pores in the substrate, followed by drying.

Hereinafter, the present invention will be explained in further detail.

The present invention is characterized in that it utilizes inorganic porous particles as a component for an organic/inorganic composite layer (active layer) coated on a porous substrate having pores.

Figure 1:
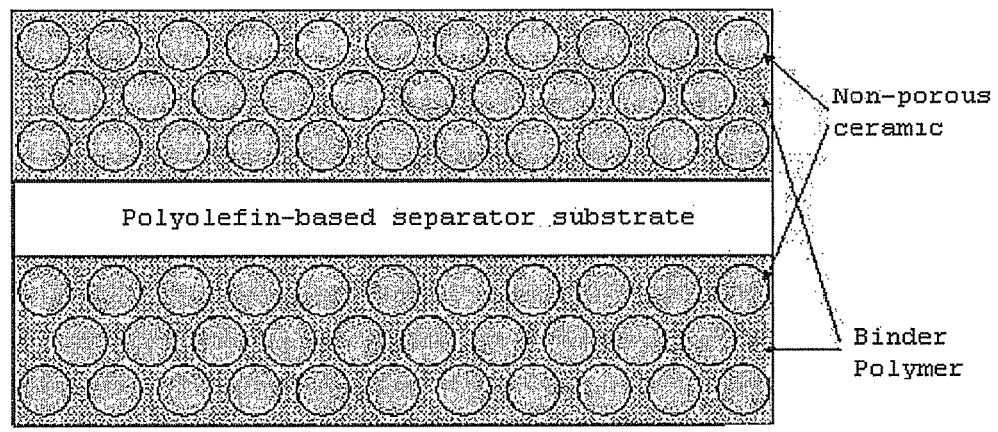
FIG. 1 is a cross-sectional schematic view of an organic/inorganic composite porous separator according to the prior art.

As an attempt to resolve poor thermal safety of a conventional polymer separator, a composite separator containing inorganic particles in a polymer separator substrate was used. However, the inorganic particles provided here were non-porous inorganic particles (see FIG. 3). Besides, even though there may be some pores, they were only micropores having a diameter of 2 nm or less (see FIG. 4). Therefore, the conventional separator as an end product (i.e., a solid electrolyte) also has a dense inorganic coating layer with no pores, or, if any, it fails to serve as an effective spacer for transmitting lithium ions because it has an irregular pore structure with the pore size in unit of angstrom (Å) (see FIG. 1 for reference). In other words, despite the improvement of thermal safety, the battery can still have a degraded quality due to a low porosity.

Figure 5:
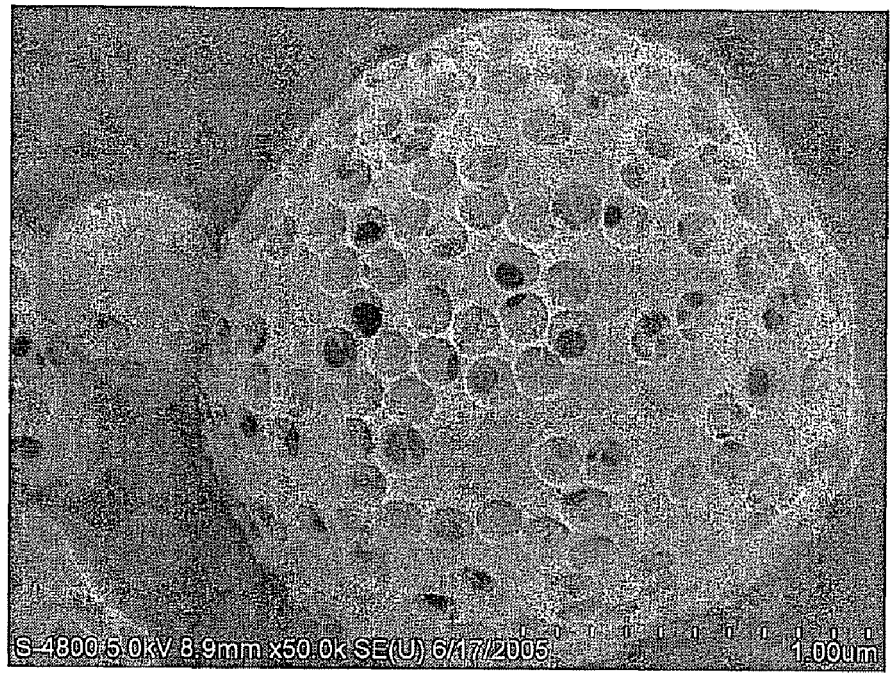
FIG. 5 is a photograph taken by a Scanning Electron Microscope (SEM) of an inorganic porous particle used in Examples 1-3.

On the contrary, the organic/inorganic composite porous separator according to the present invention is distinct from the ones in the art in that it contains many inorganic porous particles with macropores of uniform size and shape (see FIG. 5).

Pores in the separator function not only as a pathway of an active component, e.g., lithium ions ($Li^+$), resulting in electrochemical reactions in an electrochemical device, but also as a space where an electrolyte transmitting lithium ions swells. After all, an increase of pores means an increase of the pathway for lithium ions and an expansion of the electrolyte swelling space. From this viewpoint, the pore size and the porosity are very important factors for the control of ion conductivity in a battery and thus, are directly related to the quality of the battery.

That is, in a case that lithium ions causing an electrochemical reaction in a lithium secondary battery travel to both electrodes, pores in a separator placed between both electrodes can theoretically work as a pathway for the lithium ions as long as the pores have a diameter equal to or greater than that of the lithium ion. For information, the diameter of the lithium ion is several angstroms (Å). In reality, however, when lithium ions travel to both electrodes, they do not travel alone but are solvated by a number of molecules of carbonate based compounds for example in the electrolyte as a transfer medium. Therefore, if pore size or porosity of the separator is within the approximate range of the diameter of the lithium ion, the mobility of lithium ions is reduced and hence, their ion conductivity in the battery is decreased, leading to degraded battery quality.

For example, in a case that the electrolyte contains ethylene carbonate (EC), dimethyl carbonate (DMC) and the like, lithium ions are solvated, being tightly encompassed by four EC or DMC molecules relatively bigger than them, and travel towards both electrodes. Here, the size of electrolyte molecules is about 1 to 2 nm or bigger. To improve the battery quality, therefore, it is important to take both the size of a lithium ion and the size of an electrolyte molecule into consideration.

Figure 2:
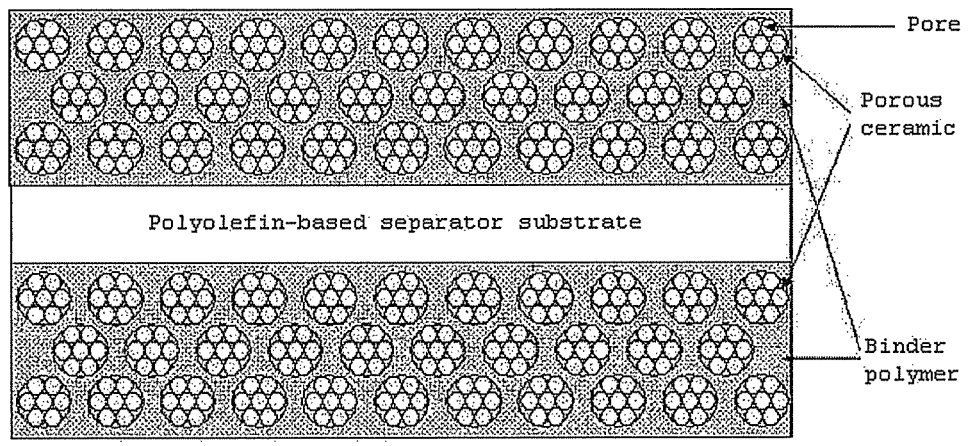
FIG. 2 is a cross-sectional schematic view of an organic/inorganic composite porous separator, manufactured according to the present invention.
Figure 6:
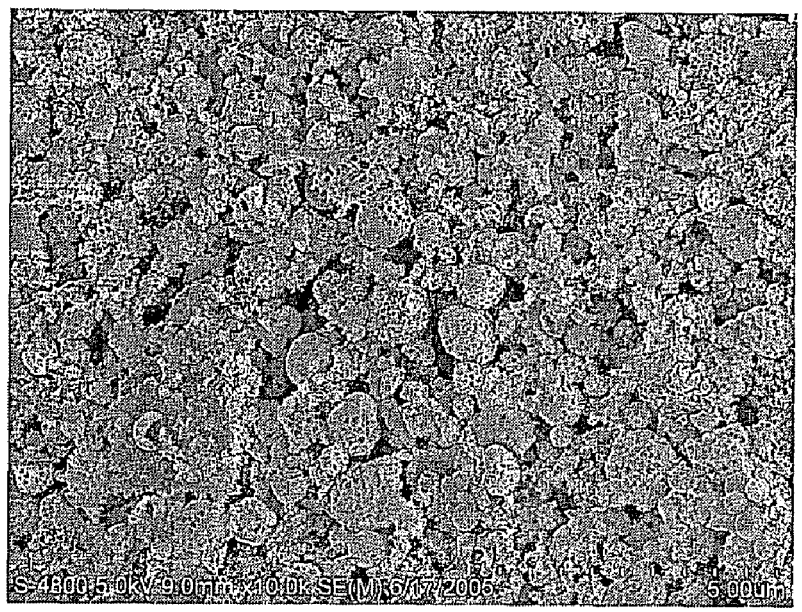
FIG. 6 a photograph taken by a Scanning Electron Microscope (SEM) of an organic/inorganic composite layer including inorganic porous particles and binder polymer among the organic/inorganic composite porous separator (porous $Al_2O_3$/PVdF-CTFE) manufactured in Example 1.
Figure 7:
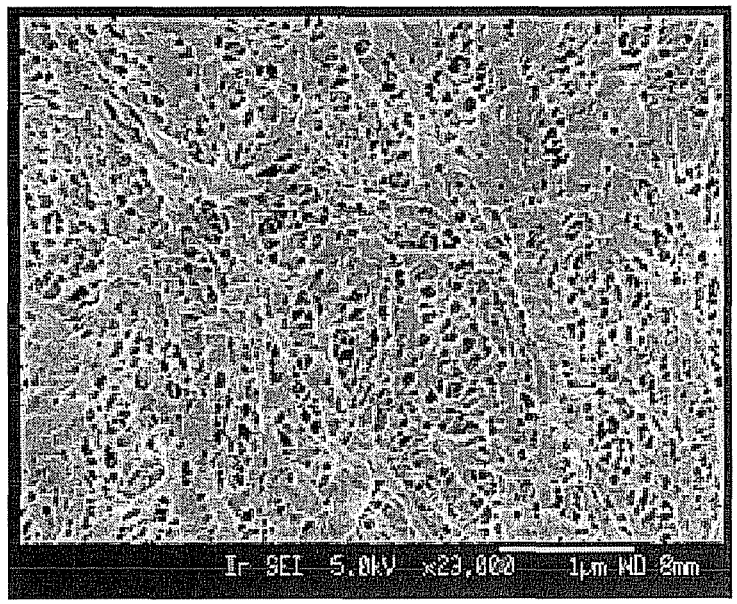
FIG. 7 is a photograph taken by a Scanning Electron Microscope (SEM) of a polyolefin-based separator substrate among the organic/inorganic composite porous separator manufactured in Example 1.

The organic/inorganic composite porous separator (membrane) according to the present invention consists of (a) a porous substrate; and (b) an organic/inorganic composite layer formed on the substrate. As shown in FIGS. 2, 6 and 7, both the porous substrate (a) and the organic/inorganic composite layer (b) have a number of regular (or uniform) pore structures that are large enough for the electrolyte molecules and the solvated lithium ions to pass through and at the same time, the inorganic particles (c) contained in the organic/inorganic composite layer are structurally characterized with macropores that are sufficiently large to be able to transmit the electrolyte molecules and the solvated lithium ions. Such a triple porous structure means a high degree of swelling of electrolytes as well as an increase in the pathway of lithium ions in the electrolyte-filled space, so the lithium ion conductivity may be improved and electrochemical reactions in the battery are activated, demonstrating an equivalent performance to the conventional polyolefin-based separator (see FIG. 1).

In addition, although the organic/inorganic composite layer used as a component or a coating component of the conventional separator could ensure safety of a battery, its use of non-porous inorganic particles which are heavy brought an increase in the total weight of the battery. On the other hand, the present invention used inorganic porous particles retaining a number of macropores therein, to thereby achieve improved safety and quality of a battery as well as a markedly reduced weight. This leads to a reduction of the battery weight, eventually increasing energy density per unit weight of the battery.

In the organic/inorganic composite porous separator according to the present invention, one component present in the organic/inorganic composite porous separator coated onto the surface of a porous substrate and/or part of the pores in the substrate is inorganic particles that are typically used in the art. Hence, there is no particular limitation in selection of inorganic particles in terms of components and shapes, as long as they are big enough to transmit electrolyte molecules and solvated lithium ions. Nevertheless, it is preferable to use inorganic particles having macropores of 50 nm or greater in diameter.

As aforementioned, a macropore is defined by IUPAC as a pore having a diameter of 50 nm or greater. The macropores may exist individually or combined in the particle.

There is no particular limitation in porosity of the inorganic porous particles. The porosity can be adjusted diversely within a range of 30 to 95%, preferably, 50 to 90%. If porosity of the porous particle is below 30%, it is difficult to expect swelling of an electrolyte to the pores existing in the porous particle and further the improvement of battery performance. Meanwhile, if porosity of the porous particle exceeds 95%, mechanical strength of the particle itself can be weakened. Such a pore structure within the set range serves as an additional pathway of lithium ions and the space for electrolyte to swell, contributing to the improvement of battery performance.

Moreover, as surface area of the inorganic porous particle increases significantly due to plural pores existing in the particle itself, the density is reduced. In the field, inorganic particles with high density are not easily dispersed during a coating process and cause a problem like an increase in the weight of a battery. Therefore, it is desired to use inorganic particles with density as low as possible. For example, the density and the surface area of the inorganic porous particle may fall within a range of 1 to 4 g/cc and a range of 10 to 50 $m^2/g$, respectively.

Furthermore, the inorganic porous particle in the organic/inorganic composite layer formed on the porous substrate serves to form pores with an interstitial volume formed among inorganic particles as they bond to each other and at the same time, functions as a spacer helping the organic/inorganic composite layer maintain its physical shape.

There is no particular limitation in materials for the inorganic porous particles as long as they are electrochemically stable and are not subjected to oxidation and/or reduction at the range of drive voltages (for example, 0-5V based on $Li/Li^+$) of a battery to which they are applied. In particular, it is preferable to use inorganic particles having ion conductivity as high as possible, because such inorganic particles can improve ion conductivity and performance in an electrochemical device. Additionally, inorganic particles having high dielectric constant are desirably used because they can contribute to an increase in the dissociation degree of an electrolyte salt in a liquid electrolyte, say, a lithium salt, to thereby improve the ion conductivity of the electrolyte.

For these reasons, it is desirable to use inorganic particles having a high dielectric constant of or more, inorganic particles having lithium conductivity or mixtures thereof.

Non-limiting examples of inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or mixtures thereof.

As used herein, "inorganic particles having lithium ion conductivity" are referred to as inorganic particles containing lithium elements and having a capability of conducting lithium ions without storing lithium. Inorganic particles having lithium ion conductivity can conduct and move lithium ions due to defects present in their structure, and thus can improve lithium ion conductivity and contribute to the improvement of battery performance. Non-limiting examples of such inorganic particles having lithium ion conductivity include: lithium phosphate ($Li_3PO_4$), lithium titanium phosphate ($Li_xTi_y(PO_4)_3$, $0<x<2$, $0<y<3$), lithium aluminium titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y\leq1$, $0<z<1$, $0<w<5$), such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_2PO_4$—$Li_2S$—$SiS_2$, $P_2S_5$ type glass ($Li_xP_yS_z$, $0<x<3$, $0<y<3$, $0<z<7$) such as $LiI$—$Li_2S$—$P_2S_5$, or mixtures thereof. More specific examples of these include $(Li_{0.5}La_{0.5})TiO_3$, $Li_2Ca_{0.5-x}TaO_3$, $Li_{0.2}[Ca_{1-y}Sr_y]_{0.4}TaO_3$, $Li_6BaLa_2Ta_2O_{12}$, $Li_3VO_4$, $Li_3PO_4/Li_4SiO_4$, $Li_2S$—$GeS_2$—$P_2S_5$, $Li_2S$—$P_2S_5$, $Li_2S$—$GeS_2$—$Ga_2S_3$, $Li_2S$—$SiS_2$, $Li_2S$—$P_2S_5$, $Li_2S$—$P_2S_5$—$SiS_2$ and the like.

The above-described inorganic particles, that have never been used as separators, for example $Pb(Zr,Ti)O_3$ (PZT), $Pb_{1-x}La_xZr_{1-y}Ti_yO_3$ (PLZT), Pb $(Mg_3Nb_{2/3})O_3$—$PbTiO_3$ (PMN-PT), hafnia ($HfO_2$), etc., have a high dielectric constant of 100 or more. The inorganic particles also have piezoelectricity so that an electric potential can be generated between both surfaces by the charge formation, when they are drawn or compressed under the application of a certain pressure. Therefore, the inorganic particles can prevent internal short circuit between both electrodes, thereby contributing to improve the safety of a battery. Additionally, when such inorganic particles having a high dielectric constant are combined with inorganic particles having lithium ion conductivity, synergic effects can be obtained.

Although there is no particular limitation in size of inorganic porous particles, inorganic porous particles are in size from 0.001 μm to 10 μm. When the size is less than 0.001 μm, inorganic porous particles have poor dispersibility so that structure and physical properties of the organic/inorganic composite porous separator cannot be controlled with ease.

When the size is greater than 10 µm, the resultant organic/inorganic composite porous separator has an increased thickness under the same solid content, resulting in degradation in mechanical properties. Furthermore, such excessively large pores may increase a possibility of an internal short circuit being generated during repeated charge/discharge cycles.

A preferable pore size of the inorganic porous particle itself is in a range of 0.05 to 1 µm, but it is not limited thereto. When the pore size is less than 0.05 µm, it is so small that the electrolyte cannot get through. Meanwhile, when the pore size is greater than 1 µm, the inorganic porous particles become so large that the thickness of the organic/inorganic composite porous separator can be increased.

The inorganic porous particles present in the mixture of the inorganic porous particles and the binder polymer for forming the organic/inorganic composite porous separator are preferably in an amount of 50 to 97 wt %, more preferably in an amount of 80 to 95 wt % with respect to 100 wt % of the total weight of the mixture. When the content of the inorganic porous particles is less than 50 wt %, the binder polymer is present in such a large amount that the interstitial volume formed among the inorganic porous particles is decreased and further the pore size and porosity are decreased, resulting in degradation in the quality of a battery. On the other hand, when the content of the inorganic porous particles is greater than 97 wt %, the polymer content is too low to provide sufficient adhesion among the inorganic particles, resulting in degradation in mechanical properties of an end product of the organic/inorganic composite porous separator.

In the organic/inorganic composite porous separator according to the present invention, a binder polymer currently used in the art is another component present in the organic/inorganic composite layer formed on the surface of the porous substrate or on a part of the pores in the porous substrate.

It is desirable to use a polymer that does not melt in an electrolyte but is gelled with a liquid electrolyte, so that the inorganic particles can be stably fixed to improve their structural safety and further the battery performance can be improved by high ion conductivity and an increase in the degree of swelling of the liquid electrolyte.

In the present invention, the binder polymers preferably have a glass transition temperature ($T_g$) as low as possible, more preferably $T_g$ of between −200° C. and 200° C., because they can improve mechanical properties such as flexibility and elasticity of a final coating layer.

When the binder polymer has ion conductivity, it can further improve the performance of an electrochemical device. Therefore, the binder polymer preferably has a dielectric constant as high as possible. In practice, because the dissociation degree of a salt in an electrolyte depends on the dielectric constant of a solvent used in the electrolyte, the polymer having a higher dielectric constant can increase the dissociation degree of a salt in the electrolyte used in the present invention. The dielectric constant of the polymer may range from 1.0 to 100 (as measured at a frequency of 1 kHz), and is preferably 10 or more.

When a polymer having a high degree of swelling is used, the polymer may absorb the electrolyte infiltrated after assemblage of a battery to be provided with electrolyte ion conductivity. Further, since the polymer has excellent affinity to electrolytes, it can be applied to a polar electrolyte for battery use that was regarded to be difficult to use. Additionally, when binder polymers that can be gelled and swelled with a liquid electrolyte is used, such binder polymers can form a gel type organic/inorganic composite electrolyte through a reaction between the infiltrate electrolyte and the polymer. Such electrolyte, compared with the conventional gel type electrolyte, is easy to be prepared and demonstrates high ion conductivity and a high degree of swelling, thereby contributing to the improvement of battery performance. Therefore, it is preferable to use a polymer having a solubility parameter of between 15 and 45 $MPa^{1/2}$, more preferably of between 15 and 25 $MPa^{1/2}$, and between 30 and 45 $MPa^{1/2}$. When the binder polymer has a solubility parameter of less than 15 $Mpa^{1/2}$ or greater than 45 $Mpa^{1/2}$, it has a difficulty in swelling with a conventional liquid electrolyte for battery use.

Non-limiting examples of the binder polymer that may be used in the present invention include polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide or mixtures thereof. Other materials may be used alone or in combination, as long as they satisfy the above characteristics.

The organic/inorganic composite layer forming the organic/inorganic composite porous separator of the present invention may further comprise additives other than the inorganic porous particles and binder polymer.

There is no particular limitation in the substrate in the organic/inorganic composite porous separator according to the present invention, as long as it is a porous substrate having pores. For example, a polyolefin-based separator typically used in the art, a heat resistant porous substrate having a melting point of 200° C. and the like may be used also. Especially, the heat-resistant substrate can ensure good thermal safety of the organic/inorganic composite porous separator by fundamentally resolving the separator shrinkage problem observed in the conventional separator due to external and/or internal thermal impacts.

Non-limiting examples of the porous substrate that may be used include high density polyethylene, linear low density polyethylene, low density polyethylene, ultrahigh molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene or mixtures thereof. However, other heat resistant engineering plastics may be used with no particular limitation.

Although there is no particular limitation in thickness of the porous substrate, the porous substrate preferably has a thickness of between 1 µm and 100 µm, more preferably of between 5 µm and 50 µm. When the porous substrate has a thickness of less than 1 µm, it is difficult to maintain mechanical properties. Meanwhile, when the porous substrate has a thickness of greater than 100 µm, it may function as resistance layer.

Although there is no particular limitation in pore size and porosity of the porous substrate, the porous substrate preferably has a porosity of between 5% and 95%. The pore size (diameter) preferably ranges from 0.01 µm to 50 µm, more preferably from 0.1 µm to 20 µm. When the pore size and porosity are less than 0.01 µm and 5%, respectively, the porous substrate may function as resistance layer. However, when the pore size and porosity are greater than 50 µm and 95%, respectively, it is difficult to maintain mechanical properties.

The porous substrate may take the form of a membrane or fiber. When the porous substrate is fibrous, it may be a nonwoven web forming a porous web (preferably, spunbond type web comprising long fibers or melt blown type web).

Although there is no particular limitation in the thickness of the organic/inorganic composite layer formed by coating the porous substrate with the mixture of inorganic porous particles and the binder polymer, the thickness is preferably in a range of 1 to 100 μm. In addition, pore size and porosity of the organic/inorganic composite layer formed by the interstitial volume among the inorganic porous particles are preferably in a range of 0.05 to 10 μm and 5 to 95%, respectively.

Moreover, although there is no particular limitation in thickness of the organic/inorganic composite porous separator according to the present invention, it is preferably in a range of 5 to 100 μm, more preferably of between 10 and 30 μm. However, this thickness can be controlled in relation to the battery performance.

The organic/inorganic composite porous separator according to the present invention may be manufactured by a conventional process known to one skilled in the art. One embodiment of a method for manufacturing the organic/inorganic composite porous separator according to the present invention, includes the steps of: (a) dissolving a binder polymer into a solvent to form a polymer solution; (b) adding inorganic porous particles to the polymer solution obtained from step (a) and mixing them; and (c) coating the mixture of inorganic porous particles with binder polymer obtained from step (b) on the surface of a substrate having pores or on a part of the pores in the substrate, followed by drying.

First, 1) inorganic porous particles are added and dispersed in a polymer solution to prepare a mixture of the inorganic porous particles and the binder polymer.

The inorganic porous particles may be prepared according to a typical method used in the art, for example, a self-assembly process, a sol-gel method, a condensation-drying method, a spray pyrolysis method, or a combination thereof. Especially, the spray pyrolysis method is preferred.

According to a preferred embodiment, the inorganic porous particles can be prepared by dispersing inorganic precursors and heat-decomposable compounds in a dispersion medium, misting the inorganic precursor solution, and performing a thermal decomposition and a crystallization processes.

There is no particular limitation in the inorganic precursors, as long as they contain at least one of the typical inorganic components. For instance, in case of preparing alumina, aluminum containing salts such as aluminum nitrate, aluminum chloride, aluminum acetate, aluminum sulfate and the like may be used. Moreover, a nano alumina such as fumed alumina having a stable dispersed phase may also be used as the precursor material.

There is no particular limitation in the heat-decomposable compounds, as long as they are pyrolyzed at a temperature lower than the melting temperature of the inorganic particles. Such examples include polymers or foaming agents. In particular, polystyrene is preferred. Although there is no particular limitation in shape of the heat-decomposable compounds either, bead shaped compounds are desired for the formation of uniform pores.

In order to prepare porous particles by the spray pyrolysis method, it is necessary to disperse uniform-sized, heat-decomposable beads (e.g., polystyrene in the present invention) having been prepared in an inorganic precursor solution. Such a precursor solution is misted through a liquid aerosol generator, and droplets thusly obtained then pass through a high-temperature reactor, being subjected to the drying and thermal decomposition processes, and are crystallized to produce inorganic porous particles.

There is no particular limitation in the temperature for the thermal treatment, as long as it is higher than the decomposition temperature of the heat-decomposable compounds. The heat-decomposable compounds after the thermal treatment are all decomposed in a reactor, and parts filled with the compounds become pores. The resulting inorganic porous particles may have various pore sizes and porosities, depending on size and mixing ratio of the heat-decomposable compounds.

Later, the inorganic porous particles are added and dissolved in a polymer solution. Here, non-limiting examples of the solvent for dissolving polymers include acetone, tetrahydrofuran, methylene chloride, chloroform, dimethylformamide, N-methyl-2-pyrrolidone, cyclohexane, water or mixtures thereof.

It is preferable to perform a step of pulverizing inorganic particles after adding the inorganic porous particles to the prepared polymer solution. Conventional pulverization methods, preferably a method using a ball mill, may be used.

In order to control the pore size, porosity and thickness of the organic/inorganic composite porous separator to be formed finally, factors for controlling pores of the separator, such as, the pore size, porosity, size (particle diameter), content of the inorganic porous particles, and a composition (mixing) ratio of the inorganic porous particles to the binder polymer can be properly controlled. For instance, as the weight ratio (I/P) of the inorganic particles (I) to the polymer (P) increases, porosity of the organic/inorganic composite porous separator according to the present invention increases. Therefore, the thickness of the organic/inorganic composite porous separator increases under the same solid content (weight of the inorganic particles+weight of the binder polymer). Additionally, the pore size increases in proportion to the pore formation among the inorganic particles. When the size (particle diameter) of the inorganic particles increases, interstitial distance among the inorganic particles increases, thereby increasing the pore size.

2) The mixture of the prepared inorganic porous particles and the binder polymer is coated onto the prepared porous substrate having pores, followed by drying to obtain the organic/inorganic composite porous separator of the present invention. Here, as for the coating step, any methods known to one skilled in the art including dip coating, die coating, roll coating, comma coating or combinations thereof may be used.

The organic/inorganic composite porous separator according to the present invention is formed by coating it directly on the surface of a porous substrate having pores so that the pores on the porous substrate and the organic/inorganic composite layer can be anchored to each other, thereby providing a firm physical, organic bonding between the organic/inorganic composite layer and the porous substrate. Meanwhile, the pore structures existing between the organic/inorganic composite layer and each of the inorganic porous particles may be retained without getting interfered with each other. Therefore, problems related with mechanical properties such as brittleness can be improved. Additionally, such increased interfacial adhesion between the pore substrate and the organic/inorganic composite coating layer can decrease the interfacial resistance.

The organic/inorganic composite porous separator according to the present invention, obtained as described above, may be used as separator in an electrochemical device, preferably in a lithium secondary battery. If the binder polymer is a polymer that can be gelled when swelled with a liquid electrolyte, the polymer may react with the electrolyte injected after assembling a battery by using the separator, and thus be gelled to form a gel type organic/inorganic composite electrolyte.

Further, the present invention provides an electrochemical device comprising: a cathode; an anode; the organic/inorganic composite porous separator according to the present invention, interposed between the cathode and anode; and an electrolyte.

Such electrochemical devices include any devices in which electrochemical reactions occur and particular examples thereof include all kinds of primary batteries, secondary batteries, fuel cells, solar cells or capacitors. Particularly, the lithium secondary battery among the secondary batteries is preferred. Examples of such include a lithium metal secondary battery, lithium ion secondary battery, lithium polymer secondary battery or lithium ion polymer secondary battery.

The electrochemical device may be manufactured by a conventional method known to one skilled in the art. In one embodiment of the method for manufacturing the electrochemical device, the electrochemical device is provided by forming an electrode assembly from the organic/inorganic composite porous separator interposed between a cathode and anode, and then by injecting an electrolyte into the assembly.

There is no particular limitation in a cathode, an anode and a liquid electrolyte to be used with the organic/inorganic composite porous separator, and any of those that can be used in a conventional electrochemical device may be used.

There is an advantage that a battery can be assembled with ease in that the organic/inorganic composite porous separator of the present invention can demonstrate excellent adhesion by controlling the contents of inorganic particles and binder polymer present in the organic/inorganic composite layer in the separator, physically properties of the polymer and the like.

Best Mode for Carrying Out the Invention

Reference will now be made in detail to the preferred embodiments of the present invention. It is to be understood that the following examples are illustrative only and the present invention is not limited thereto.

Example 1-5

Preparation of Organic/Inorganic Composite Porous Separator and Manufacture of Lithium Secondary Battery Using the Same Example 1

1.1 Preparation of Inorganic Alumina Porous Particles

Figure 8:
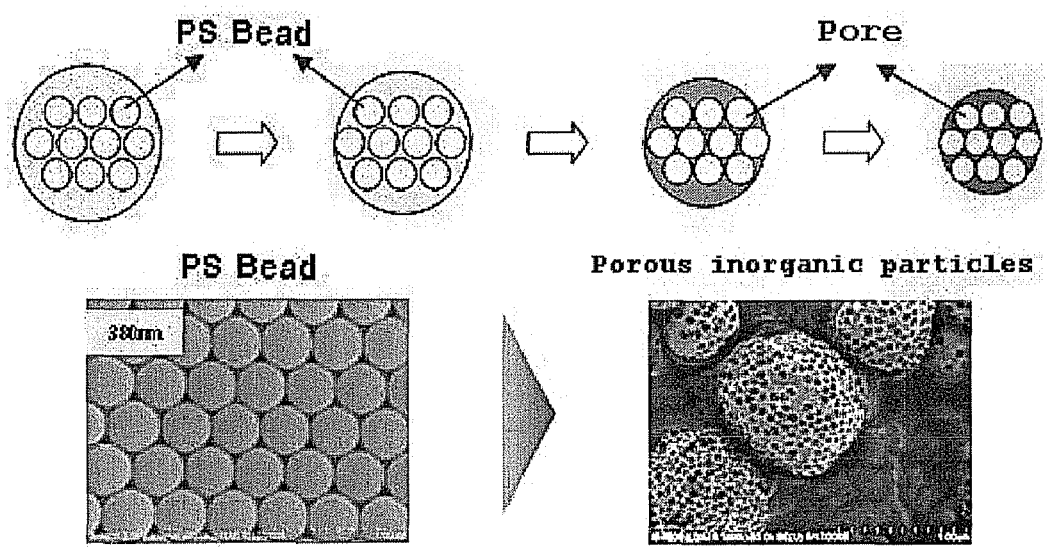
FIG. 8 diagrammatically illustrates a preparation process of inorganic porous particles and a structure of the prepared inorganic porous particle.

As an alumina precursor compound, aluminum nitrate was dissolved in distilled water to make a solution of 0.2M. After the aluminum nitrate was completely dissolved in the distilled water, the prepared polystyrene beads of 100 nm in diameter were added to the solution at an amount of 45% by weight of the alumina, and sufficiently stirred. FIG. 8 shows an SEM photograph of the polystyrene beads used at this time. A precursor solution thusly obtained was injected into a spray pyrolysis device to thereby prepare inorganic alumina porous particles. SEM photographs of such alumina porous particles are shown in FIGS. 5 and 8.

1-2. Preparation of Organic/Inorganic Composite Porous Separator (PVdF-CTFE/a\Al$_2$O$_3$)

PVdF-CTFE polymer (polyvinylidene fluoride-chlorotrifluoroethylene copolymer) was added to acetone in the amount of about 5 wt % and dissolved therein at 50□ for about 12 hours or more to form a polymer solution. To the polymer solution obtained as described above, Al$_2$O$_3$ powder prepared in the Example 1-1, having a pore size of 100 nm and porosity of 75%, was added to make Al$_2$O$_3$/PVdF-CTFE=80/20 (wt %). Then, the Al$_2$O$_3$ powder was pulverized and dispersed for about 12 hours or more by using a ball mill method to form slurry. The particle size of porous Al$_2$O$_3$ in the slurry can be controlled depending on the size (particle size) of beads used in the ball mill method and ball milling time, but in this Example the alumina was pulverized into a particle size of about 400 nm to provide slurry. Then, the slurry was coated on surface of a polyethylene film (porosity: 45%) by using a dip coating process to a thickness of about 18 μm, and a coating layer thickness was adjusted to about 3 μm. After measuring with a porosimeter, the organic/inorganic composite layer coated on the polyethylene film had a pore size of 0.4 μm and a porosity of 55%, respectively, and a pore structure thereof is shown in FIG. 2.

1-3. Manufacture of Lithium Secondary Battery (Manufacture of Cathode)
To N-methyl-2-pyrrolidone (NMP) as a solvent, 94 wt % of lithium cobalt composite oxide (LiCoO$_2$) as cathode active material, 3 wt % of carbon black as conductive agent and 3 wt % of PVDF (polyvinylidene fluoride) as binder were added to form slurry for a cathode. The slurry was coated on Al foil having a thickness of 20 μm as cathode collector and dried to form a cathode. Then, the cathode was subjected to roll press.
(Manufacture of Anode)
To N-methyl-2-pyrrolidone (NMP) as solvent, 96 wt % of carbon powder as anode active material, 3 wt % of PVDF as binder and 1 wt % of carbon black as conductive agent were added to form mixed slurry for an anode. The slurry was coated on Cu foil having a thickness of 10 μm as anode collector and dried to form an anode. Then, the anode was subjected to roll press.
(Manufacture of Battery)
The cathode and anode obtained as described above were stacked with the organic/inorganic composite porous separator obtained as described in Example 1-2 to form an assembly. Then, an electrolyte (ethylene carbonate (EC)/ethylemethyl carbonate (EMC)=1:2 (volume ratio) containing 1M of lithium hexafluorophosphate (LiPF$_6$)) was injected thereto to provide a lithium secondary battery.

Example 2

Example 1 was repeated to provide a lithium secondary battery, except that PVDF-HFP was used instead of PVDF-CTFE to obtain an organic/inorganic composite porous separator (PVdF-HFP/porous Al$_2$O$_3$).

Example 3

Example 1 was repeated to provide a lithium secondary battery, except that powder of porous TiO$_2$ was used instead of porous Al$_2$O$_3$ powder to obtain an organic/inorganic composite porous separator (PVdF-CTFE/TiO$_2$).

Example 4

Example 1 was repeated to provide a lithium secondary battery, except that porous Al$_2$O$_3$ powder having pore size of 0.1 μm (100 nm) and porosity of 53% was used to form slurry and the slurry was coated onto a polyethylene terephthalate porous film (porosity: 80%) having a thickness of about 20 μm to obtain an organic/inorganic composite porous separator for the battery. After measuring with a porosimeter, the active layer impregnated into and coated on the porous polyethylene terephthalate substrate had a average pore size of 0.3 μm and a porosity of 71%.

Example 5

Example 1 was repeated to provide a lithium secondary battery, except that porous TiO2 powder having the same pore size and porosity as the porous $Al_2O_3$ powder and a polyethylene terephthalate porous film were used to obtain an organic/inorganic composite porous separator (PVdF-CTFE/porous $TiO_2$) for the battery. After measuring with a porosimeter, an average pore size and porosity were of 0.3 μm and a porosity of 66%, respectively.

Comparative Examples 1-3

Comparative Example 1

Figure 3:
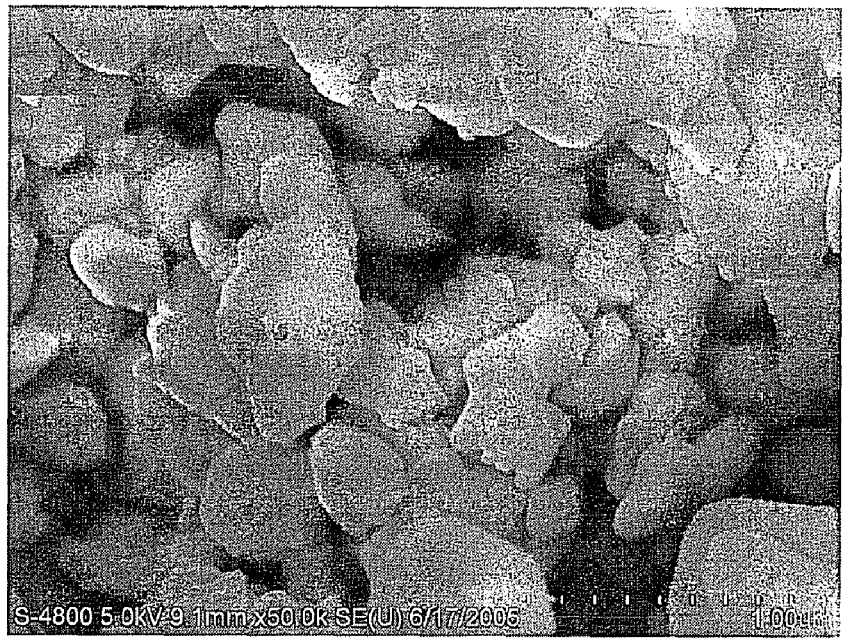
FIG. 3 is a photograph taken by a Scanning Electron Microscope (SEM) of a non-porous inorganic particle used in Comparative Example 1.

Example 1 was repeated to provide an organic/inorganic composite porous separator and a lithium secondary battery, except that conventional non-porous inorganic particles ($Al_2O_3$) were used instead of the porous inorganic particles ($Al_2O_3$). An SEM phorograph of the non-porous inorganic particle is shown in FIG. 3.

Comparative Example 2

Example 1 was repeated to provide a lithium secondary battery, except that a conventional PE film in the art was used.

Comparative Example 3

Figure 4:
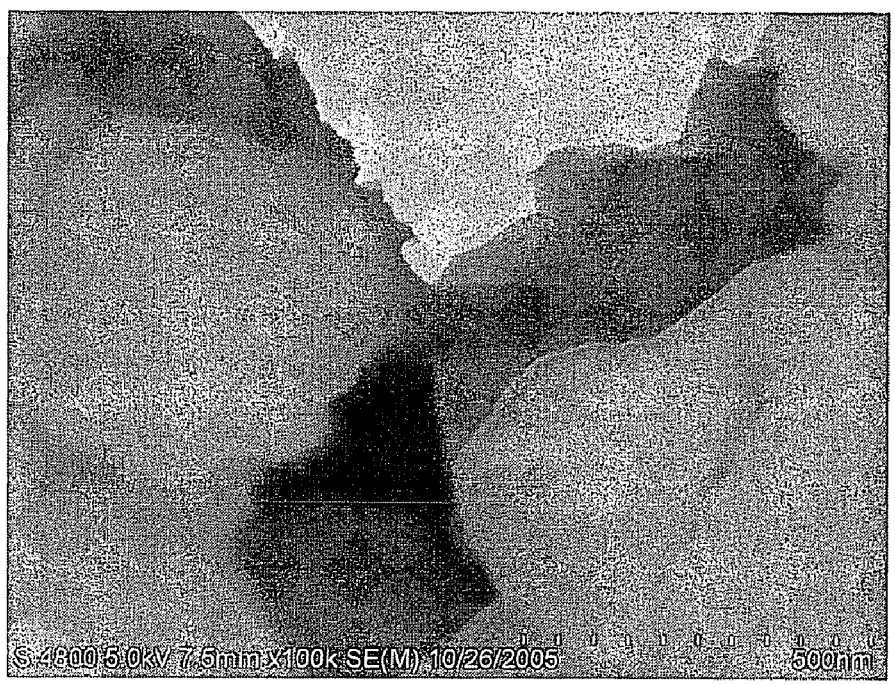
FIG. 4 is a photograph taken by a Scanning Electron Microscope (SEM) of an inorganic particle (zeolite) having micropores (defined by IUPAC) used in Comparative Example 3.

Example 1 was repeated to provide a lithium secondary battery, except that zeolite having a pore size of 1 nm and porosity of 33% was used instead of the porous inorganic particles ($Al_2O_3$) to obtain an organic/inorganic composite porous separator for the battery. An SEM photograph of zeolite having a pore size of about 1 nm is shown in FIG. 4.

Experimental Example 1

Analysis of Inorganic Porous Particle

The following test was performed to analyze characteristics of inorganic porous particles present in an organic/inorganic composite porous separator according to the present invention.

The sample used in this test was porous $Al_2O_3$ obtained according to Examples 1 and 2. As control, a non-porous $Al_2O_3$ having the same component as the porous particle used in Comparative Example 1 and zeolite of Comparative Example 3 were used.

When analyzed by using a Scanning Electron Microscope (SEM), the non-porous $Al_2O_3$ particle used in Comparative Example 1 had an irregular structure without pores (see FIG. 3 for reference). In addition, zeolite used in Comparative Example 3 had pores, but they were too small to be observed even with the SEM (see FIG. 4 for reference). On the contrary, the porous $Al_2O_3$ particle used in the Examples of the present invention was in a spherical shape and had pores both in its surface and inside (see FIGS. 5 and 8 for reference).

Such a configuration feature was also confirmed through a surface analysis. When the surface area of each particle was measured by a nitrogen adsorption method, the surface area of the non-porous $Al_2O_3$ particle of Comparative Example 1 was only 6.4 $m^2/g$, but the surface area of the porous $Al_2O_3$ particle used in Examples 1 and 2 was about 33.9 $m^2/g$, which is about 5 times larger than the surface area of the non-porous particle (see Table 1 for reference). An analysis can be drawn that such an increase in the surface area is resulted from pores present in the porous $Al_2O_3$ particle.

Experimental Example 2

Property Analysis of Organic/Inorganic Composite Porous Separator

The following experiment was performed to analyze the surface of the organic/inorganic composite porous separator obtained according to the present invention.

2-1. Surface Analysis (SEM)

The sample used in this test was the composite porous separator obtained by coating the porous $Al_2O_3$/PVdF-CTFE onto the polyethylene film obtained according to Example 1.

When analyzed by using Scanning Electron Microscope (SEM), the organic/inorganic composite porous separator according to the present invention showed a uniform (or regular) pore structure wherein both the polyethylene film substrate (see FIG. 7) and the organic/inorganic composite layer to which the porous $Al_2O_3$ was introduced (see FIG. 6) had pores of 1 μm or less, and pores were formed in the porous particle itself.

2.2 Analysis of Physical Properties

The sample used in this test was the organic/inorganic composite porous separator obtained by coating the porous $Al_2O_3$/PVdF-CTFE onto the polyethylene film obtained according to Example 1. As control, the organic/inorganic composite porous separator obtained by coating the non-porous $Al_2O_3$/PVdF-CTFE onto the polyethylene film obtained according to Comparative Example 1, the conventional polyethylene film of Comparative Example 2, and the organic/inorganic composite porous separator of Comparative Example 3 that is obtained by using zeolite with a micropore size of about 1 nm were used.

Table 1 below provides results of the organic/inorganic composite porous separators in Example 1 having a coating layer of a uniform thickness and in Comparative Examples 1-3. As can be seen in Table 1, the organic/inorganic composite porous separator in Example 1 had a half weight per unit area compared with that of the organic/inorganic composite porous separator using non-porous inorganic particles in Comparative Example 1, but had a high porosity and thus, high ion conductivity (see Table 1 for reference). Particularly, the organic/inorganic composite porous separator in Example 1 had higher values both in pore size and in porosity, compared with Comparative Example 3 having a micropore size of about 1 nm, demonstrating its high ion conductivity (see Table 1 for reference).

TABLE 1

| | Ex. 1 | Comp. Ex. 1 | Comp. Ex. 2 | Comp. Ex. 3 |
|---|---|---|---|---|
| BET surface area (inorganic particle) | 33.9 | 6.4 | | 90 |
| Density (inorganic particle) | 2.71 | 4.08 | | 2.2 |
| Thickness of coating layer (μm) | 5 | 5 | — | 5 |
| Weight of coating layer (g/m$^2$) | 3.94 | 8.4 | — | 5.4 |
| Porosity (%) | 77.5 | 46.8 | — | 65 |
| Ion conductivity (S/cm) | $4.8 \times 10^{-4}$ | $2.5 \times 10^{-4}$ | $5.1 \times 10^{-4}$ | $2.8 \times 10^{-4}$ |

2.3 Analysis of Correlation Between Inorganic Porous Particles and Organic/Inorganic Composite Porous Separator The sample used in this test was the organic/inorganic composite porous separator obtained by coating the porous Al$_2$O$_3$/PVdF-CTFE onto the polyethylene film obtained according to Example 1.

Figure 9:
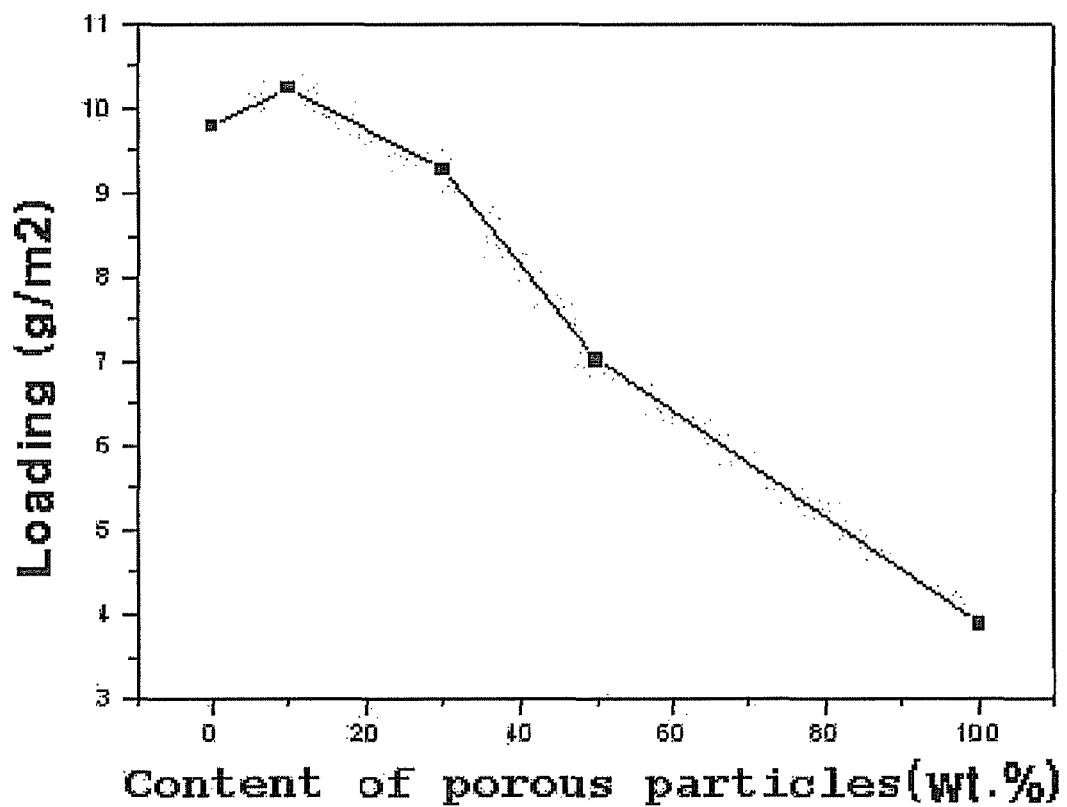
FIG. 9 is a graph showing variation in loading amount of organic/inorganic composite porous separator depending on the content ratio of inorganic porous particles.
Figure 10:
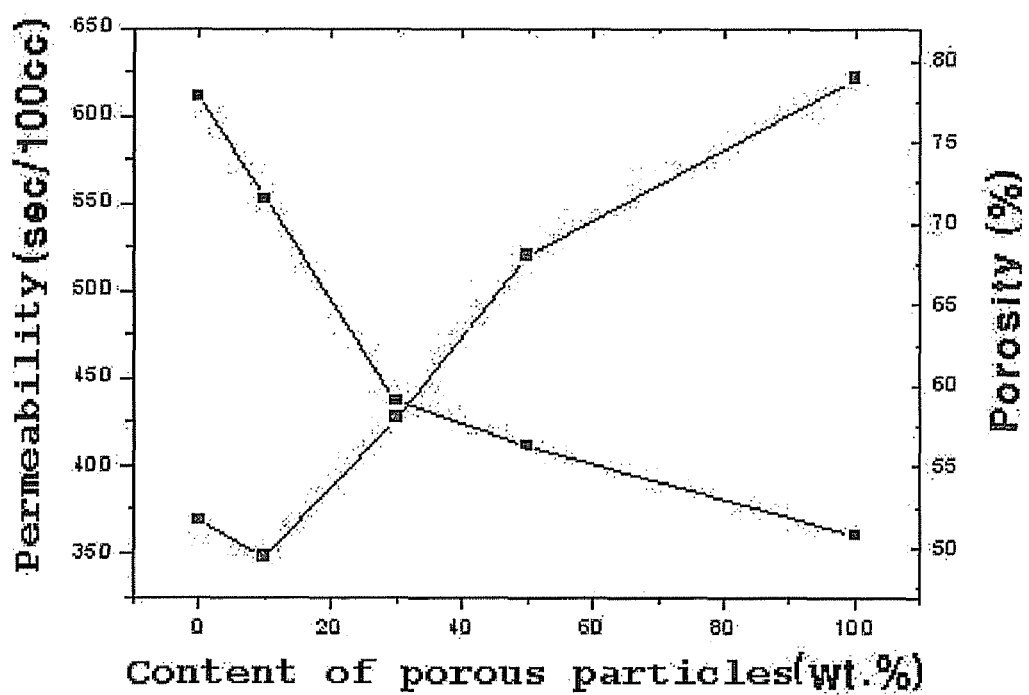
FIG. 10 is a graph showing variation in permeability/porosity of an organic/inorganic composite porous separator depending on the content ratio of inorganic porous particles.

The analysis results of physical properties, such as loading amount, permeability, and porosity, of the organic/inorganic composite porous separator by inorganic porous particle contents show that the weight of the organic/inorganic composite separator decreased as the content of the inorganic porous particles present in the coating layer increased (see FIG. 9 for reference). Moreover, as the content of inorganic porous particles increased, the porosity of the organic/inorganic composite porous separator was increased while the permeability (i.e., air permeability) was decreased (see FIGS. 9 and 10 for reference).

Experimental Example 3

Evaluation of Performance of Lithium Secondary Battery

The following test was performed to evaluate C-rate of a lithium secondary battery comprising the organic/inorganic composite porous separator according to the present invention.

Lithium secondary batteries according to Examples 1-3 were used as samples. As controls, used were the battery comprising the organic/inorganic composite separator that is obtained by using non-porous inorganic particles according to Comparative Example 1, the battery using a commercial PE separator according to Comparative Example 2, and the battery comprising the organic/inorganic composite separator that is obtained by using zeolite having a micropore size of about 1 nm according to Comparative Example 3, respectively. Each battery having a capacity of 760 mAh was subjected to cycling at a discharge rate of 0.5 C, 1 C and 2 C. The following Table 2 shows the discharge capacity of each battery, the capacity being expressed on the C-Rate basis.

According to the test results, each of lithium secondary batteries according to Examples 1 to 3 shows high C-rate characteristics comparable to those of the battery according to Comparative Examples 1 and 3. In addition, as shown in Table 2, the capacity at a rate of up to 2 C is equal to the high C-rate discharge characteristics of the conventional polyolefin-based separator.

TABLE 2

| Discharge rate | Ex. 1 (mAh) | Ex. 2 (mAh) | Ex. 3 (mAh) | Comp. Ex. 1 (mAh) | Comp. Ex. 2 (mAh) | Comp. Ex. 3 (mAh) |
|---|---|---|---|---|---|---|
| 0.5 C | 756 | 755 | 753 | 748 | 755 | 750 |
| 1 C | 744 | 746 | 742 | 731 | 746 | 732 |
| 2 C | 692 | 693 | 690 | 681 | 693 | 680 |

INDUSTRIAL APPLICABILITY

As can be seen from the foregoing, the organic/inorganic composite porous separator of the present invention comprises inorganic porous particles as a component of the organic/inorganic composite layer, so that an additional pathway for lithium ions can be created due to a number of pores existing in the inorganic porous particle itself. In this manner, degradation in the battery performance can be minimized, while energy density per unit weight can be increased by the weight loss effect.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A manufacturing method of the organic/inorganic composite porous separator comprising the steps of:
   (a) dispersing inorganic precursors and heat-decomposable compounds in a dispersion medium, misting the inorganic precursor solution, and performing a thermal decomposition and a crystallization process, to thereby prepare inorganic porous particles, wherein the inorganic porous particles have a plurality of macropores, said macropores having a diameter of 50 nm or greater in the particle itself thereby forming a pore structure;
   (b) adding and mixing the inorganic porous particles obtained from step (a) with a polymer solution containing a binder polymer; and
   (c) coating the mixture obtained from step (b) on at least one region selected from the group consisting of a surface of a porous substrate having pores and a part of the pores in the porous substrate, following by drying.

2. The method according to claim 1, wherein the heat-decomposable compounds are polymer or blowing agent decomposed or pyrolyzed at a temperature lower than a melting point of the inorganic material.

3. The method according to claim 1, wherein temperature for the thermal decomposition in the step (a) is higher than a decomposition temperature of the heat-decomposable compounds.

* * * * *